Aug. 21, 1923.
C. RODGERS
AUTOMOBILE FENDER
Filed Aug. 7, 1922
1,465,589
2 Sheets-Sheet 1
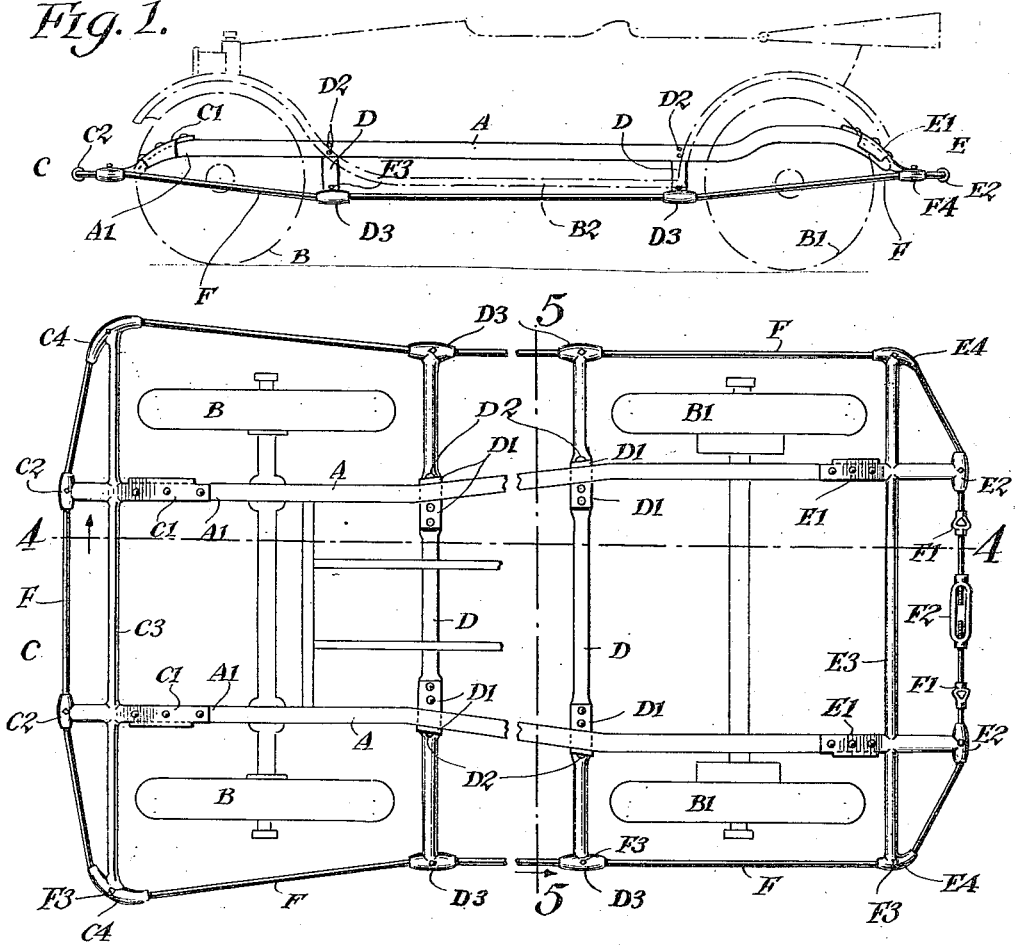
Fig. 1.
Fig. 2.
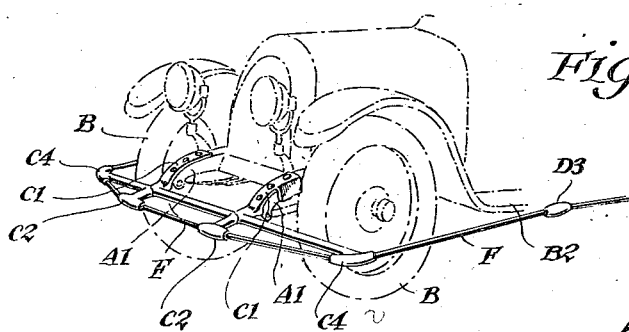
Fig. 3.
Inventor
Cowan Rodgers
By Cyrus Kehr
Attorney Aug. 21, 1923.
C. RODGERS
AUTOMOBILE FENDER
Filed Aug. 7, 1922
1,465,589
2 Sheets-Sheet 2
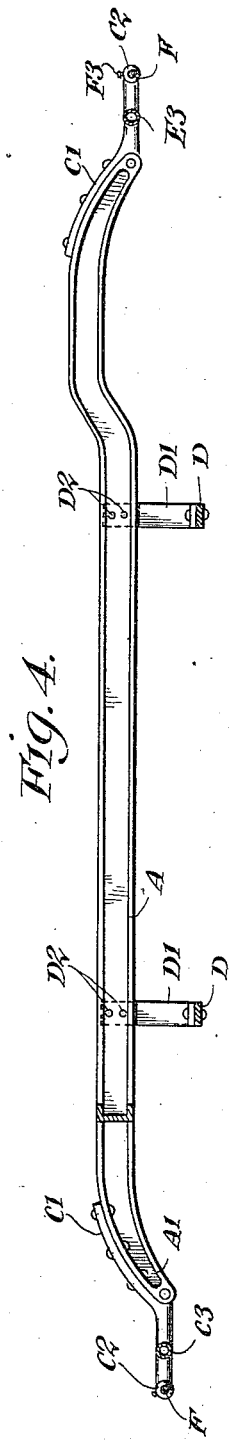
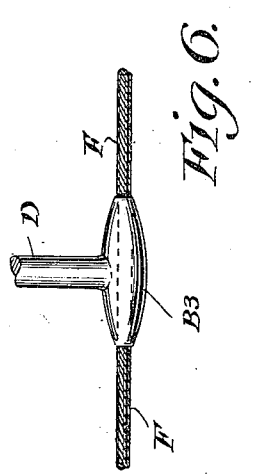
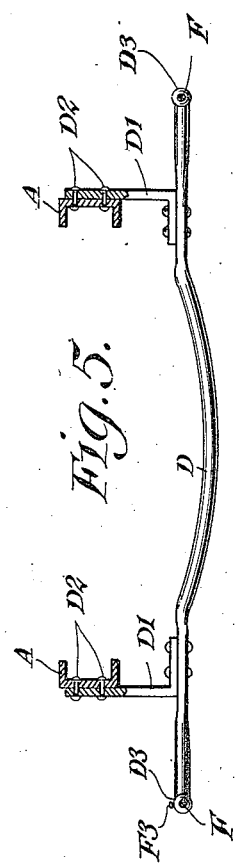
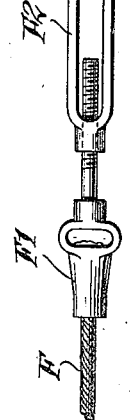
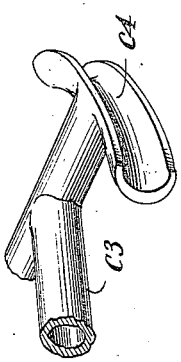
Inventor
Cowan Rodgers
By Cyrus Weir
Attorney Patented Aug. 21, 1923.

1,465,589

UNITED STATES PATENT OFFICE.

COWAN RODGERS, OF KNOXVILLE, TENNESSEE.

AUTOMOBILE FENDER.

Application filed August 7, 1922. Serial No. 580,127.

*To all whom it may concern:*

Be it known that I, COWAN RODGERS, a citizen of the United States, residing at Knoxville, in the county of Knox and State of Tennessee, have invented a new and useful Improvement in Automobile Fenders, of which the following is a specification, reference being had to the accompanying drawing.

This improvement relates to a fender structure for automobiles which is to serve to protect the automobile when in collision with another automobile or any other body and also to protect the other automobile or body.

The object of the invention is to provide such a fender structure in a form adapted to serve at the ends and also at the sides of the automobile, in such manner as to reduce shock and avoid interlocking during collision. A further object of the invention is to provide such a structure in economical form and in a form to the least extent cumbersome and unsightly.

At each end of the automobile, my improved fender structure embodies a truss; and this fender structure is so applied to the ends and sides of the automobile as to cause that structure and the automobile frame to form a truss structure, whereby greater stability is given to the automobile frame.

In the accompanying drawings,

Fig. 1 is a side elevation showing an automobile in outline with my improved fender structure applied thereto;

Fig. 2 is a plan showing the frame of an automobile with my improved fender applied thereto, the middle part of the structure being broken away;

Fig. 3 is a perspective of the front part of an automobile with my improved fender applied thereto;

Fig. 4 is a longitudinal upright section on the line, 4—4, of Fig. 2, looking in the direction of the arrow;

Fig. 5 is a transverse section on the line, 5—5, of Fig. 2, looking toward the right;

Fig. 6 is a detail view of one of the cable supports placed at the sides of the automobile;

Fig. 7 is a detail view of one of the curved cable supports;

Fig. 8 is a detail view of another form of the curved cable supports;

Fig. 9 is a detail view of a turn-buckle, whereby the ends of the cable are joined.

Referring to said drawings, A, A, are the usual horizontal side members of the frame of the automobile. At each end of each of said members is a spring horn, $A^1$. B, B are the front or steering wheels of the automobile. $B^1$, $B^1$ are the rear wheels of the automobile. $B^2$, $B^2$ are the usual running boards extending along the sides of the automobile.

At the front of the automobile is a tension member supporting structure, C. Said structure comprises brackets, $C^1$, cable supports, $C^2$, a cross bar, $C^3$, and cable supports, $C^4$. The rear ends of the brackets, $C^1$, are curved to rest upon the upper face of the spring horns, $A^1$, and said ends are bolted or clamped to said horns. On the forward end of each bracket, $C^1$, is a cable support, $C^2$. Each of said supports is in the form of a sleeve which is horizontal and transverse to the length of the automobile and of proper internal diameter to receive the cable, F. The cross bar, $C^3$, is supported by the brackets, $C^1$, and the ends of said bar project outward away from the middle, upright, longitudinal plane of the automobile farther than the reach of the front wheels, B, when the wheels are turned sidewise as far as permitted for steering the automobile. On each end of the cross bar, C, is a curved cable support, $C^4$, at which place the cable changes direction. Fig. 7 shows in detail such a support, the support being grooved or channeled on the outer face to conform to one half of the face of the cable, F. In Fig. 8, the corner support, $C^4$, is shown as being tubular so as to form a sleeve in which the cable will lie.

In the space between the pair of forward wheels and the pair of rear wheels, two cross bars, D, are placed horizontally and transversely to the length of the machine under the side members, A, A, and under and near the running boards and secured to the side members. In the form shown in Fig. 5, each of said cross bars has two branches or hangers, $D^1$, one of said hangers being attached to one and the other to the other of the two side members, A, by a bolt, $D^2$, or other suitable means. The ends of said cross bars extend outward a little farther than the outer edges of the running boards, $B^2$. On each end of each of said bars is a cable support, $D^3$, in the form of a sleeve through which the cable, F, extends.

At the rear of the automobile is a bracket structure, E, which is similar to the bracket structure, C, at the front of the automobile. The bracket structure, E, consists of the brackets, $E^1$, cable supports, $E^2$, cross bar, $E^3$, and cable supports, $E^4$, corresponding, respectively, to the members, $C^1$, $C^2$, $C^3$ and $C^4$ of the bracket structure, C.

The cable, F, is a strong wire cable, preferably formed of steel wire. Such a cable three-quarters of an inch thick has been found sufficient. The cable is passed through the cable supports, $C^2$, $C^4$, $D^3$, $E^2$ and $E^4$. Each end of the cable is secured to one of the outer members, $F^1$, of a turnbuckle having an inner or middle link member, $F^2$. By turning the link member, $F^2$, to draw the members, $F^1$, toward each other, the ends of the cable are drawn toward each other, whereby desired tension is given to the cable. In the drawings, the turnbuckle is shown at the rear of the automobile between the rear cable supports, $E^2$. But it will be understood that the turn-buckle may be placed at any other point along the course of the cable, and that more than one turn-buckle may be used.

It has been stated above that the cross bars, D, D, are only long enough to extend outward a little beyond the outer edges of the running boards, $B^2$. The rear cross bar, $E^3$, is preferably of the same length as the cross bars, D, D. But the sidewise movement of the front steering wheels, B, B, necessitates placing the part of the cable, F, which is forward of the forward cross bar, D, farther away from the longitudinal upright middle plane of the automobile. This is accomplished by making the cross bar, $C^3$, longer than the cross bars, D, D.

A set-bolt, $F^3$, may be seated in any desired number of the cable supports, $C^2$, $D^3$ and $E^2$, the inner ends of the bolts being made to bear against the cable to hold the cable immovably in the support. Before these bolts are set, the cable is to be put under tension by shortening the turnbuckle.

The ends of the sleeve-form cable supports are tapered to facilitate the sliding of colliding external bodies along the cable and over the sleeve-form supports.

The cable possesses flexibility. The supporting structures, C and E, and the cross bars, D, being long relative to their cross-section also possess some flexibility. When there is contact between the cable and another automobile or any other body, the cable yields to a limited degree, due to the flexibility of the cable and the supporting structures and the cross bars, D, whereby shock is absorbed or reduced. If the engagement between the cable fender and the other automobile or body is diagonal to the part of the cable which is engaged, such body will tend to slide or slip along the course of the cable until the direction of said body has been changed or its force reduced or over-come. Thus the cable constitutes a deflecting member extending entirely around the automobile in such position and relationship as to avoid interlocking of the wheels and other usually-exposed parts of the automobile when there is collision with another automobile or any other body. Avoiding such interlocking is an important step in avoiding damage to the colliding bodies and is important relative to the reduction of force and the relative change of course of the colliding bodies.

It is to be observed that the manner of attaching the supporting structures for the cable supports is to be varied according to requirements presented by various types of automobiles.

It is also to be observed that the cable is a tension member which may be varied; but it must be recognized that the yielding due to flexibility and the adaptation to permit sliding of a colliding body along the tension member are important.

Relative to avoiding interlocking during collision, it is to be noted that all the tension member supporting structures extend horizontally away from the automobile in such manner as to make the tension member serve to keep the colliding body from engaging the supporting structures and, as above stated, the ends of the cable supports are tapered to facilitate slipping or sliding of the colliding body.

At the forward end of the automobile the sleeves, $C^2$ and $C^4$, constitute a group of engaging members arranged transversely to the automobile, and the corner sleeves are in a transverse line which is nearer the automobile than is the transverse line in which are the sleeves. $C^2$. When the cable, F, has been applied, the cable and the cross bar, $C^3$, and the arms supporting the sleeves, $C^2$, together form a truss, whereby greater strength is given to the part of the fender structure at that end of the automobile. A similar truss is formed at the rear end of the car by the cable and the cross bar, $E^3$, and the arms supporting the sleeves, $E^2$. As shown in Fig. 1, the sleeves, $D^3$, at the sides of the automobile are below the level of the corner sleeves, $C^4$ and $E^4$, and the body of each side member, A, is above the level of the sleeves, $C^4$ and $E^4$. Hence the frame and the end supporting structures and the brackets supporting the sleeves, $D^3$, and the tension member or cable, F, together form a truss structure.

I claim as my invention,

1. The combination with the frame of an automobile, of supporting members extending outward at the ends and sides of the automobile, and a tension member extending around and spaced from the automobile and supported by said supporting members, substantially as described.

2. The combination with the frame of an automobile, of supporting members extending outward at the ends and sides of the automobile and having flexibility, and a tension member extending around and spaced from the automobile and supported by said supporting members, substantially as described.

3. The combination with the frame of an automobile, of supporting members extending outward at the ends and sides of the automobile, and a cable extending around and spaced from the automobile and supported by said supporting members, substantially as described.

4. The combination with the frame of an automobile, of supporting members extending outward at the ends and sides of the automobile and having flexibility, and a cable extending around and spaced from the automobile and supported by said supporting members, substantially as described.

5. The combination with the frame of an automobile, of supporting members extending outward at the ends and sides of the automobile, a tension member extending around the automobile and supported by said supporting members, and adjustable means for joining the ends of the tension member, substantially as described.

6. In an autmobile having running boards, the combination with the frame of the automobile, of supporting members extending outward at the ends and sides of the automobile and a tension member extending around the automobile and supported by said supporting members at approximately the height of and outward of the running boards, substantially as described.

7. The combination with the frame of an automobile, of tension member supports at the sides of the automobile and tension member supports placed at the front of the automobile farther laterally than the side tension member supports, whereby space for the lateral moving of the steering wheels is left within the tension member, substantially as described.

8. The combination with the side members of an automobile frame, of supporting members extending outward from the ends and sides of the side members, and a tension member extending around and spaced from the automobile and supported by said supporting members, substantially as described.

9. The combination with an automobile frame comprising spring horns, of supporting structures secured to said horns, and a tension member extending around the automobile and supported by said supporting members, substantially as described.

10. The combination with an automobile frame comprising spring horns, of supporting structures secured to said horns, laterally-directed tension member supporting structures between the ends of said frame, and a tension member extending around the automobile and supported by said supporting structures, substantially as described.

11. The combination with an automobile having running boards along its sides, of a tension fender structure extending around the automomible at approximately the height of and near the running boards and adapted to permit sliding on said tension structure when there is collision between said structure and an outside body, substantially as described.

12. The combination with an automobile having running boards along its sides, of a yielding tension fender structure extending around the automobile at approximately the height of and near the running boards and adapted to permit sliding on said tension structure when there is collision between said structure and an outside body, substantially as described.

13. The combination with an automobile having running boards along its sides, of a relatively stationary tension fender structure extending around the automobile at approximately the height of and near the running boards and adapted to permit sliding on said tension structure when there is collision between said structure and an outside body, substantially as described.

14. The combination with the frame of an automobile, of sleeve-form supporting members at the ends and sides of the automobile, a tension member extending around the automobile and through said sleeve-form supporting members, and means on a part of said sleeve-form members for binding the tension member against movement in said sleeve-form member, substantially as described.

15. The combination with the frame of an automobile, of sleeve-form supporting members at the ends and sides of the automobile, a tension member extending around the automobile and through said sleeve-form supporting members, means on a part of said sleeve-form members for binding the tension member against movement in said sleeve-form member, and means for giving tension to the tension member, substantially as described.

16. The combination with the frame of an automobile, of a supporting structure supported by and extending across and away from the end of the frame and comprising longitudinal arms and transverse arms, and a tension member also extending across the end of the frame and spaced from the automobile and supported by and in front of said arms with its outer parts slanting toward the automobile, substantially as described.

17. The combination with the frame of an automobile, of a supporting structure extending across and away from the end of the frame and having engaging members spaced from the automobile and out of alignment with each other, and a tension member applied to and supported by said engaging members, substantially as described.

18. The combination with the frame of an automobile, of a supporting structure supported by and extending across and away from the end of the frame and comprising longitudinal arms and transverse arms and a tension member also extending across the end of the frame and spaced from the automobile and supported by and in front of said arms with its outer parts slanting toward the automobile in a manner to form a truss, substantially as described.

19. The combination with the frame of an automobile, of a supporting structure extending across and away from the end of the frame and having engaging members spaced from the automobile and out of alignment with each other, and a tension member applied to and supported by said engaging members in a manner to form a truss, substantially as described.

20. An attachment for an automobile comprising a supporting structure adapted to be secured to the ends of the side members of the automobile frame and to extend across and away from the end of said frame, and a tension member also extending across the end of the automobile and secured to said supporting structure spaced from the automobile and in a manner forming a truss, substantially as described.

21. An attachment for an automobile, said attachment comprising a supporting structure adapted to be secured to the ends of the frame side members and extending horizontally across and away from the end of the frame and bearing a group of members for engaging the tension member, the members of said group being arranged horizontally along the outer edge of the supporting structure and transversely to the frame and the end members of said group being in a transverse line which is nearer the end of the automobile than is the other part of said group, and a tension member supported by said engaging members, substantially as described.

22. The combination with the frame of an automobile, of a supporting structure supported by and extending across and away from the end of the frame and having along its outer transverse border a group of sleeves out of alignment with each other, and a tension member supported in said sleeves, substantially as described.

23. The combination with the frame of an automobile, of a supporting structure supported by and extending across and away from and wider than the frame and having corner engaging members and intermediate engaging members, the latter being in a transverse line which is farther from the end of the frame than is the line in which are the corner members, and a tension member extending along and engaged by said engaging members, whereby the supporting structure and said tension member form a truss, substantially as described.

24. The combination with the frame of an automobile, of a supporting structure supported by and extending across and away from each end of the frame and having engaging members, supporting structures placed intermediate the frame ends and extending away from the frame and terminating at a lower level than the level of the engaging members of the end supporting structures, and a tension member supported by the engaging members of said end structures and by said side supporting members, whereby the frame and the end structures and the side structures and the tension member together form a truss structure, substantially as described.

25. The combination with the frame of an automobile, of supporting members extending outward at the ends and sides of the automobile, the supporting members at the sides being lower than those at the ends, and a tension member extending around and spaced from the automobile and supported by said supporting members, whereby the tension member and the supporting members form a fender and said tension member and said supporting members and the automobile frame form a truss structure, substantially as described.

26. The combination with the frame of an automobile, of apertured supporting members extending outward at the ends and sides of the automobile, the supporting members at the sides being lower than the supporting members at the ends, and a tension member extending through the apertures of said members and around and spaced from the automobile, whereby said tension member and said supporting members form a fender and the tension member and the supporting members and frame together form a truss structure, substantially as described.

27. The combination with the frame of an automobile, of a supporting structure extending across and away from the end of the frame and having brackets extending to the frame and having corner sleeves and sleeves intermediate the corner sleeves, and a tension member supported in said sleeves, substantially as described.

In testimony whereof I have signed my name this 29th day of July, in the year one thousand nine hundred and twenty-two.

COWAN RODGERS.